United States Patent
Crane et al.

(12) 
(10) Patent No.: US 7,231,773 B2
(45) Date of Patent: *Jun. 19, 2007

(54) STARTUP CONTROL SYSTEM AND METHOD FOR A MULTIPLE COMPRESSOR CHILLER SYSTEM

(75) Inventors: Curtis Christian Crane, York, PA (US); Gail Elaine Lindberg, Spring Grove, PA (US)

(73) Assignee: York International Corporation, York, PA (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/822,357

(22) Filed: Apr. 12, 2004

(65) Prior Publication Data

US 2005/0223723 A1    Oct. 13, 2005

(51) Int. Cl.
*F25B 7/00* (2006.01)
*F25B 49/00* (2006.01)

(52) U.S. Cl. .................. 62/175; 62/126; 62/228.4

(58) Field of Classification Search .......... 62/175, 62/115, 126, 204, 228.4, 228, 22.85, 259.2, 62/498; 417/3, 53

See application file for complete search history.

(56) References Cited

U.S. PATENT DOCUMENTS

| | | | |
|---|---|---|---|
| 2,442,021 A | 5/1948 | Rose | |
| 3,390,320 A | 6/1968 | Kammiller et al. | |
| 3,621,365 A | 11/1971 | Beck et al. | |
| 3,909,687 A | 9/1975 | Abbondanti | |
| 4,150,425 A | 4/1979 | Nagano et al. | |
| 4,151,725 A | 5/1979 | Kountz et al. | |
| 4,152,902 A | 5/1979 | Lush | |
| 4,210,957 A | 7/1980 | Spethmann | |
| 4,384,462 A | 5/1983 | Overman et al. | |
| 4,483,152 A | 11/1984 | Bitondo | |
| 4,487,028 A | 12/1984 | Foye | |
| 4,502,842 A | 3/1985 | Currier et al. | |
| 4,546,423 A | 10/1985 | Seki | |
| 4,562,531 A | 12/1985 | Enterline et al. | |
| 4,614,089 A | 9/1986 | Dorsey | |
| 4,633,672 A | 1/1987 | Persem et al. | |
| 4,679,404 A | 7/1987 | Alsenz | |
| 4,787,211 A | 11/1988 | Shaw | |
| 4,876,859 A | 10/1989 | Kitamoto et al. | |
| 4,877,388 A | 10/1989 | Inaba et al. | |
| 4,947,655 A | 8/1990 | Shaw | |
| 4,958,118 A | 9/1990 | Pottebaum | |
| 5,010,287 A | 4/1991 | Mukai et al. | |

(Continued)

FOREIGN PATENT DOCUMENTS

DE        3832037 A1     3/1990

(Continued)

*Primary Examiner*—Chen Wen Jiang
(74) *Attorney, Agent, or Firm*—McNees Wallace & Nurick LLC

(57) ABSTRACT

A startup control algorithm for a multiple compressor liquid chiller system is provided wherein the maximum number of compressors to be started to satisfy system load conditions is provided. The control algorithm designates all of the compressors of the multiple compressor system for starting and reduces the number to be started in response to the satisfaction of several predetermined criteria. The predetermined criteria are related to the leaving chilled liquid temperature, the shutdown time for the chiller system and the last operating time period for the chiller system.

26 Claims, 4 Drawing Sheets

U.S. PATENT DOCUMENTS

| | | | |
|---|---|---|---|
| 5,123,256 | A | 6/1992 | Oltman |
| 5,131,237 | A | 7/1992 | Valbjorn et al. |
| 5,231,846 | A | 8/1993 | Goshaw et al. |
| 5,235,504 | A | 8/1993 | Sood |
| 5,343,384 | A | 8/1994 | Fisher et al. |
| 5,350,992 | A | 9/1994 | Colter |
| 5,446,645 | A | 8/1995 | Shirahama et al. |
| 5,488,279 | A | 1/1996 | Kawamoto et al. |
| 5,492,273 | A | 2/1996 | Shah |
| 5,503,248 | A | 4/1996 | Peruggi et al. |
| 5,509,504 | A | 4/1996 | McHugh et al. |
| 5,528,114 | A | 6/1996 | Tokizaki et al. |
| 5,586,444 | A | 12/1996 | Fung |
| 5,669,225 | A | 9/1997 | Beaverson et al. |
| 5,735,134 | A | 4/1998 | Liu et al. |
| 5,797,729 | A | 8/1998 | Rafuse, Jr. et al. |
| 5,845,509 | A | 12/1998 | Shaw et al. |
| 5,894,736 | A | 4/1999 | Beaverson et al. |
| 5,896,021 | A | 4/1999 | Kumar |
| 6,008,616 | A | 12/1999 | Nagayama et al. |
| 6,018,957 | A | 2/2000 | Katra et al. |
| 6,031,738 | A | 2/2000 | Lipo et al. |
| 6,035,651 | A | 3/2000 | Carey |
| 6,124,697 | A | 9/2000 | Wilkerson |
| 6,185,946 | B1 | 2/2001 | Hartman |
| 6,229,722 | B1 | 5/2001 | Ichikawa et al. |
| 6,233,954 | B1 | 5/2001 | Mehaffey et al. |
| 6,325,142 | B1 | 12/2001 | Bosley et al. |
| 6,370,888 | B1 | 4/2002 | Grabon |
| 6,408,645 | B1 | 6/2002 | Tsuboe et al. |
| 6,434,960 | B1 | 8/2002 | Rousseau |
| 6,459,596 | B1 | 10/2002 | Corzine |
| 6,459,606 | B1 | 10/2002 | Jadric |
| 6,463,748 | B1 | 10/2002 | Benedict et al. |
| 6,499,504 | B2 | 12/2002 | Wichert |
| 6,516,622 | B1 | 2/2003 | Wilson et al. |
| 6,540,148 | B1 | 4/2003 | Salsbury et al. |
| 6,579,067 | B1 | 6/2003 | Holden |
| 6,659,726 | B2 | 12/2003 | Holden |
| 2003/0037555 | A1 | 2/2003 | Street et al. |
| 2003/0041605 | A1 | 3/2003 | Butcher et al. |
| 2003/0233837 | A1 | 12/2003 | Lee et al. |
| 2004/0000155 | A1 | 1/2004 | Cline et al. |
| 2005/0223724 | A1* | 10/2005 | Crane et al. .................. 62/175 |

FOREIGN PATENT DOCUMENTS

| | | |
|---|---|---|
| EP | 0412474 A2 | 2/1991 |
| EP | 0521551 A1 | 1/1993 |
| EP | 0543622 A2 | 5/1993 |
| EP | 1271067 A | 1/2003 |
| EP | 1376842 A1 | 1/2004 |
| WO | 95/06973 | 3/1995 |
| WO | WO 03/073025 A1 | 9/2003 |

* cited by examiner

STARTUP CONTROL SYSTEM AND METHOD FOR A MULTIPLE COMPRESSOR CHILLER SYSTEM

BACKGROUND OF THE INVENTION

The present invention relates generally to a startup control for a chiller system. More specifically, the present invention relates to determining the number of compressors in a multiple compressor chiller system to start during the startup process for a multiple compressor chiller system.

Many liquid chiller or refrigeration applications use multiple compressors, i.e., two or more compressors, in one or more corresponding refrigerant circuits. One purpose for the use of multiple compressors is to obtain an increased capacity from the chiller system, which increased capacity could not be obtained by operating a single compressor. In addition, the use of multiple compressors can provide for improved reliability of the overall system by having one or more compressors remain operational to provide a reduced level of cooling capacity in the event that a compressor fails and can no longer provide cooling capacity.

The compressor motors of the chiller system can be powered directly from the AC power grid at the system location, which would result in the compressor being operated at only a single speed. Alternatively, the compressor motors can use a variable speed drive inserted between the system power grid and the motor to provide the motor with power at a variable frequency and variable voltage, which then results in the compressor being capable of operation at several different speeds. Variable speed operation of the motors can be obtained by providing a corresponding variable speed drive for each compressor motor or by connecting all of the compressor motors in parallel to the inverter output of a variable speed drive. One drawback of using a variable speed drive for each compressor is that the overall chiller system becomes more expensive because multiple drives with a given cumulative power rating are more expensive than a single drive of the same output power rating. One drawback to connecting the compressor motors in parallel to the single inverter output of the variable speed drive is that a fault or failure of one of the motors may disable the variable speed drive and thus prevent the other motors connected to the variable speed drive from operating the remaining compressors on the chiller system. This disabling of the other motors connected to the variable speed drive defeats the function of the redundant compressors because all the compressors are disabled as a result of the disabling of the motors and the variable speed drive.

One startup control for a multiple compressor system, whether the compressor motors are powered by the AC power grid or by variable speed drives, involves the starting of a lead compressor followed by the subsequent starting of additional compressors. One example of this type of control can be found in U.S. Pat. No. 4,614,089 (the '089 patent). The '089 patent is directed to controlling the operation of refrigeration systems which contain multiple compressors. The control has a "power-up set" function that activates a delay which can be set individually, and thus differently, for each of the compressors. Upon the system startup, one compressor can be started, for example, every 30 seconds until all compressors, or fewer if the desired suction pressure is achieved, are back on line. One drawback to this technique is that the maximum number of compressor cannot be started at one time and can only be obtained after a delayed time period.

Therefore, what is needed is a system and method for starting a multiple compressor chiller system that can determine the maximum number of compressors to start for a given system load.

SUMMARY OF THE INVENTION

One embodiment of the present invention is directed to a method for determining a number of compressors to start in a multiple compressor chiller system. The method includes the steps of providing a multiple compressor chiller system having a predetermined number of compressors and a variable speed drive. The variable speed drive having a predetermined number of inverters, each inverter being configured to power a corresponding motor of a compressor. The method also includes the steps of designating a number of inverters to be enabled on startup of the multiple compressor chiller system. The designated number of inverters to be enabled on startup is initially equal to the predetermined number of inverters, and the enabling of an inverter at startup of the multiple compressor chiller system starts a corresponding compressor. The method further includes the steps of determining whether at least one predetermined criteria related to conditions of the multiple compressor chiller system is satisfied and reducing the designated number of inverters to be enabled on startup by a predetermined amount in response to a determination that a predetermined criteria has been satisfied.

Another embodiment of the present invention is directed to a multiple compressor chiller system having a plurality of compressors. Each compressor of the plurality of compressors being driven by a corresponding motor and the plurality of compressors are incorporated into at least one refrigerant circuit. Each refrigerant circuit includes at least one compressor of the plurality of compressors, a condenser arrangement and an evaporator arrangement connected in a closed refrigerant loop. The chiller system also includes a variable speed drive to power the corresponding motors of the plurality of compressor. The variable speed drive has a converter stage, a DC link stage and an inverter stage. The inverter stage includes a plurality of inverters each electrically connected in parallel to the DC link stage and each powering a corresponding motor of the plurality of compressors. The chiller system further includes a control panel having a microprocessor and a memory device storing at least one control program. The control panel is configured to determine a number of compressors of the plurality of compressors to start on a startup of the multiple compressor chiller system, and includes means for designating at least one compressor of the plurality of compressors as the number of compressors of the plurality of compressors to start, means for evaluating at least one predetermined criteria related to system conditions, and means for adjusting the number of compressors of the plurality of compressors to start by a predetermined amount in response to satisfying a predetermined criteria.

One advantage of the present invention is that the chiller system efficiency is improved by operating the maximum number of compressors for a given load from the initial startup of the chiller system.

Another advantage of the present invention is that the maximum number of compressors to start and operate for a given system load can be quickly and easily determined.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
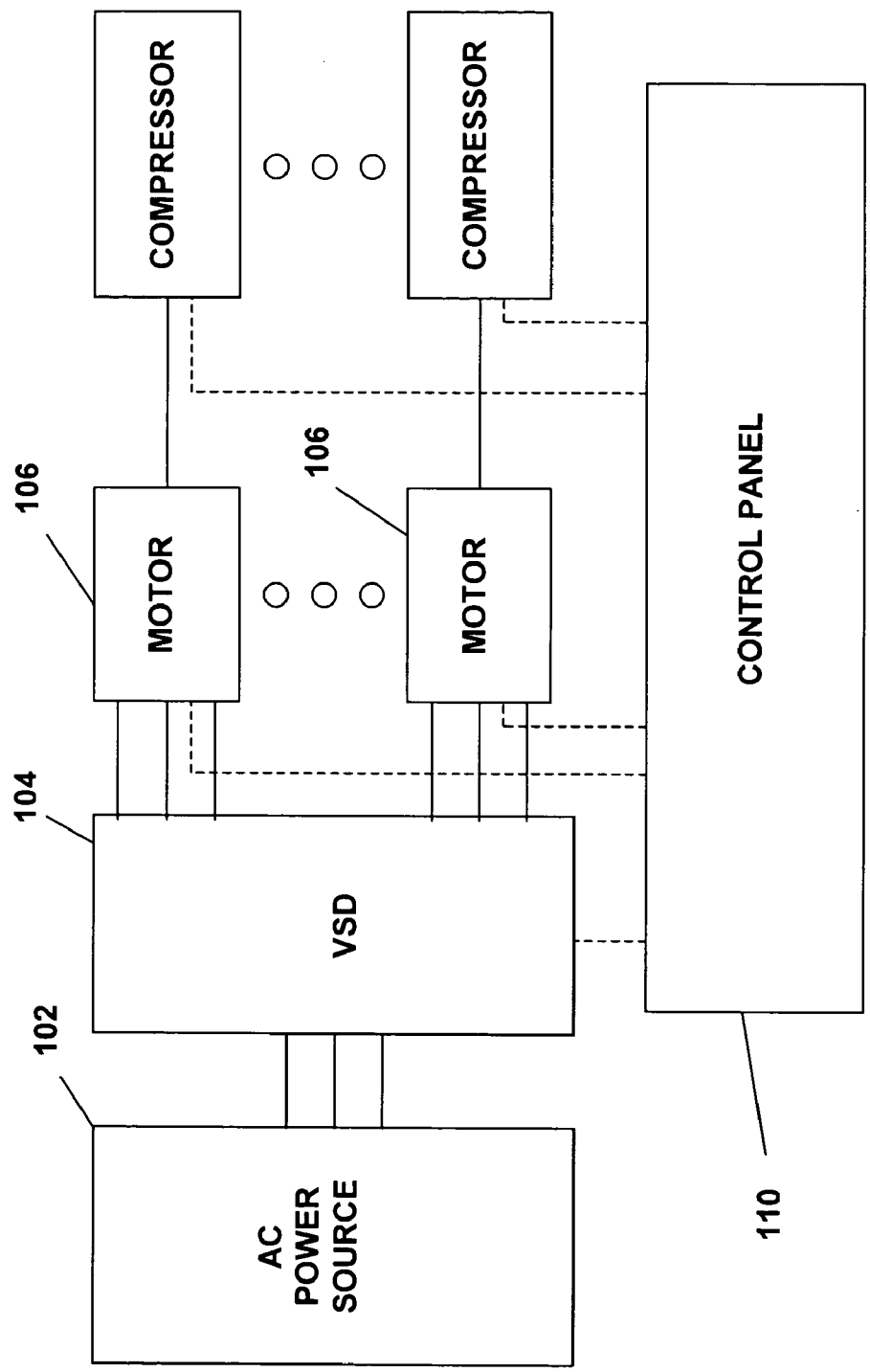
FIG. 1 illustrates a general application that can be used with the present invention.

FIG. 1 illustrates generally an application that can be used with the present invention. An AC power source 102 supplies a variable speed drive (VSD) 104, which powers a plurality of motors 106. The motors 106 are preferably used to drive corresponding compressors that can be used in a refrigeration or chiller system. A control panel 110 can be used to control operation of the VSD 104 and can monitor and/or control operation of the motors 106 and compressors.

The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V at a line frequency of 50 Hz or 60 Hz, to the VSD 104 depending on the corresponding AC power grid.

The VSD 104 receives AC power having a particular fixed line voltage and fixed line frequency from the AC power source 102 and provides AC power to each of the motors 106 at desired voltages and desired frequencies, both of which can be varied to satisfy particular requirements. Preferably, the VSD 104 can provide AC power to each of the motors 106 that may have higher voltages and frequencies and lower voltages and frequencies than the rated voltage and frequency of each motor 106. In another embodiment, the VSD 104 may again provide higher and lower frequencies but only the same or lower voltages than the rated voltage and frequency of each motor 106.

The motors 106 are preferably induction motors that are capable of being operated at variable speeds. The induction motors can have any suitable pole arrangement including two poles, four poles or six poles. However, any suitable motor that can be operated at variable speeds can be used with the present invention.

Figure 2:
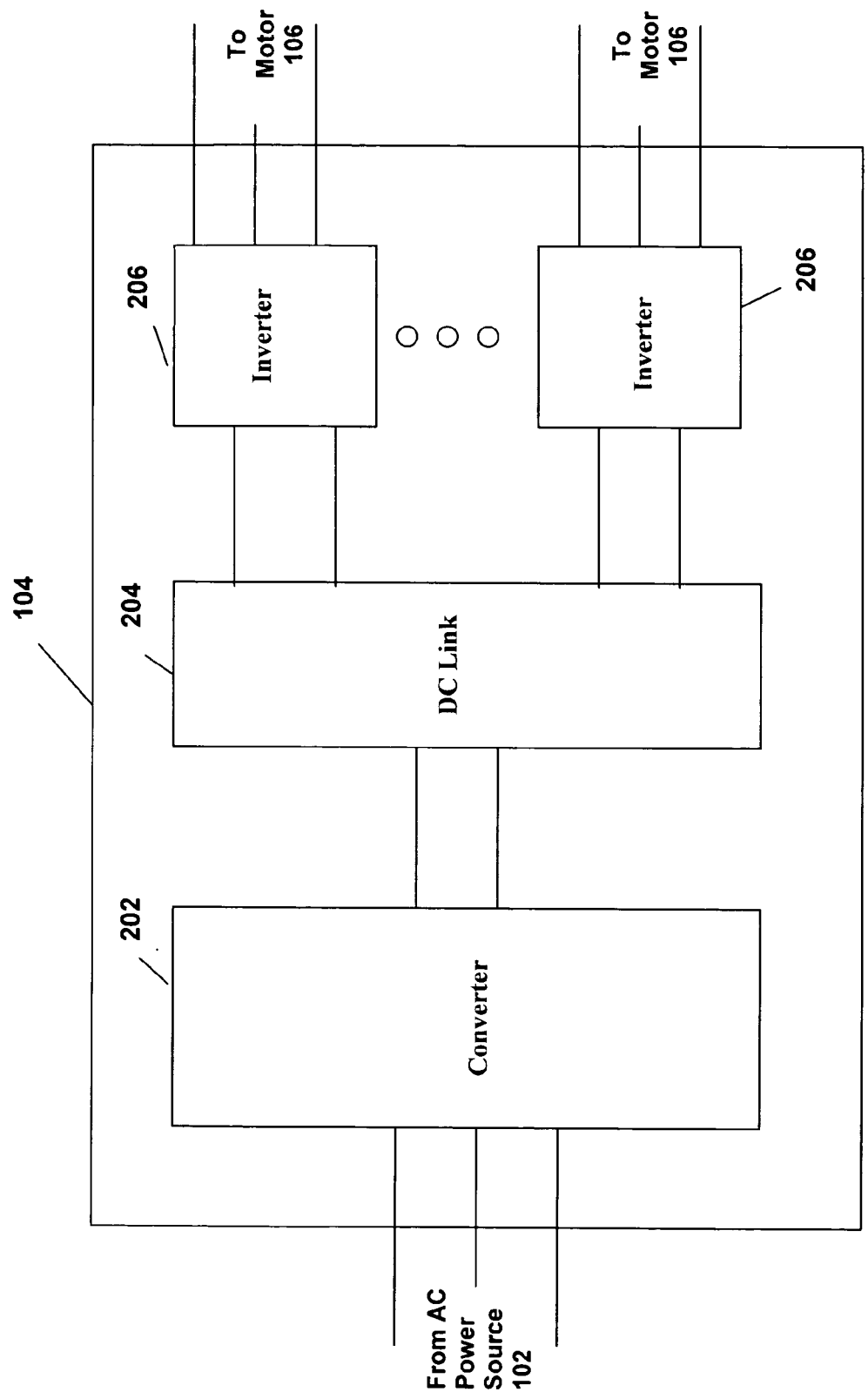
FIG. 2 illustrates schematically a variable speed drive that can be used with the present invention.

FIG. 2 illustrates schematically some of the components in one embodiment of the VSD 104. The VSD 104 can have three stages: a converter or rectifier stage 202, a DC link stage 204 and an output stage having a plurality of inverters 206. The converter 202 converts the fixed line frequency, fixed line voltage AC power from the AC power source 102 into DC power. The converter 202 can be in a rectifier arrangement composed of electronic switches that can only be turned on either by gating, when using silicon controlled rectifiers, or by being forward biased, when using diodes. Alternatively, the converter 202 can be in a converter arrangement composed of electronic switches that can be gated or switched both on and off, to generate a controlled DC voltage and to shape the input current signal to appear sinusoidal, if so desired. The converter arrangement of converter 202 has an additional level of flexibility over the rectifier arrangement, in that the AC power cannot only be rectified to DC power, but that the DC power level can also be controlled to a specific value. In one embodiment of the present invention, the diodes and silicon controlled rectifiers (SCRs) can provide the converter 202 with a large current surge capability and a low failure rate. In another embodiment, the converter 202 can utilize a diode or thyristor rectifier coupled to a boost DC/DC converter or a pulse width modulated boost rectifier to provide a boosted DC voltage to the DC link 204 in order to obtain an output voltage from the VSD 104 greater than the input voltage of the VSD 104.

The DC link 204 filters the DC power from the converter 202 and provides energy storage components. The DC link 204 can be composed of capacitors and inductors, which are passive devices that exhibit high reliability rates and very low failure rates. Finally, the inverters 206 are connected in parallel on the DC link 204 and each inverter 206 converts the DC power from the DC link 204 into a variable frequency, variable voltage AC power for a corresponding motor 106. The inverters 206 are power modules that can include power transistors or integrated bipolar power transistor (IGBT) power switches with diodes connected in parallel. Furthermore, it is to be understood that the VSD 104 can incorporate different components from those discussed above and shown in FIG. 2 so long as the inverters 206 of the VSD 104 can provide the motors 106 with appropriate output voltages and frequencies.

For each motor 106 to be powered by the VSD 104, there is a corresponding inverter 206 in the output stage of the VSD 104. The number of motors 106 that can be powered by the VSD 104 is dependent upon the number of inverters 206 that are incorporated into the VSD 104. In a preferred embodiment, there can be either 2 or 3 inverters 206 incorporated in the VSD 104 that are connected in parallel to the DC link 204 and used for powering a corresponding motor 106. While it is preferred for the VSD 104 to have between 2 and 3 inverters 206, it is to be understood that more than 3 inverters 206 can be used so long as the DC link 204 can provide and maintain the appropriate DC voltage to each of the inverters 206.

In a preferred embodiment, the inverters 206 are jointly controlled by a control system, as discussed in greater detail below, such that each inverter 206 provides AC power at the same desired voltage and frequency to corresponding motors based on a common control signal or control instruction provided to the inverters 206. The control of the inverters 206 can be by the control panel 110 or other suitable control device that incorporates the control system.

The VSD 104 can prevent large inrush currents from reaching the motors 106 during the startup of the motors 106. In addition, the inverters 206 of the VSD 104 can provide the AC power source 102 with power having about a unity power factor. Finally, the ability of the VSD 104 to adjust both the input voltage and input frequency received by the motor 106 permits a system equipped with VSD 104 to be operated on a variety of foreign and domestic power grids without having to alter the motors 106 for different power sources.

Figure 3:
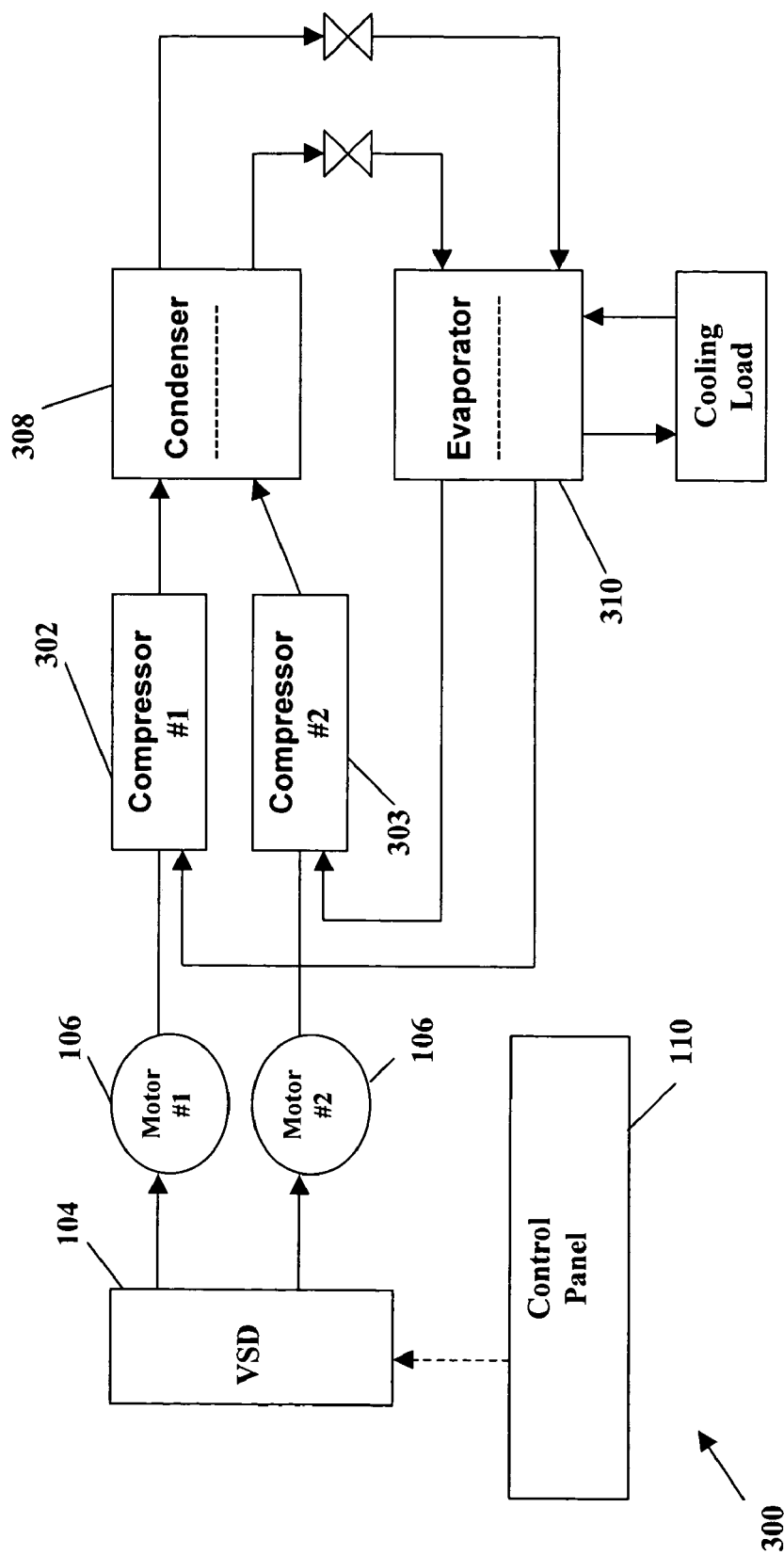
FIG. 3 illustrates an embodiment of a refrigeration or chiller system used with the present invention.

FIG. 3 illustrates generally one embodiment of the present invention incorporated in a refrigeration system. As shown in FIG. 3, the HVAC, refrigeration or liquid chiller system 300 has two compressors incorporated in corresponding refrigerant circuits, but it is to be understood that the system 300 can have one refrigerant circuit or more than two refrigerant circuits for providing the desired system load and can have more than one compressor for a corresponding refrigerant circuit. The system 300 includes a first compressor 302, a second compressor 303, a condenser arrangement 308, expansion devices, a liquid chiller or evaporator arrangement 310 and the control panel 110. The control panel 110 can include an analog to digital (A/D) converter, a microprocessor, a non-volatile memory, and an interface board to control operation of the refrigeration system 300. The control panel 110 can also be used to control the operation of the VSD 104, the motors 106 and the compressors 302 and 303. A conventional HVAC, refrigeration or liquid chiller system 300 includes many other features that are not shown in FIG. 3. These features have been purposely omitted to simplify the drawing for ease of illustration.

The compressors 302 and 303 compress a refrigerant vapor and deliver it to the condenser 308. The compressors 302 and 303 are preferably connected in separate refrigeration circuits, i.e., the refrigerant output by the compressors 302 and 303 are not mixed and travel in separate circuits through the system 300 before reentering the compressors 302 and 303 to begin another cycle. The separate refrigeration circuits preferably use a single condenser housing 308 and a single evaporator housing 310 for the corresponding heat exchanges. The condenser housing 308 and evaporator housing 310 maintain the separate refrigerant circuits either through a partition or other dividing means with the corresponding housing or with separate coil arrangements. In another embodiment of the present invention, the refrigerant output by the compressors 302 and 303 can be combined into a single refrigerant circuit to travel through the system 300 before being separated to reenter the compressors 302 and 303.

The compressors 302 and 303 are preferably screw compressors or centrifugal compressors, however the compressors can be any suitable type of compressor including reciprocating compressors, scroll compressors, rotary compressors or other type of compressor. The output capacity of the compressors 302 and 303 can be based on the operating speed of the compressors 302 and 303, which operating speed is dependent on the output speed of the motors 106 driven by the inverters 206 of the VSD 104. The refrigerant vapor delivered to the condenser 308 enters into a heat exchange relationship with a fluid, e.g., air or water, and undergoes a phase change to a refrigerant liquid as a result of the heat exchange relationship with the fluid. The condensed liquid refrigerant from condenser 308 flows through corresponding expansion devices to an evaporator 310.

The evaporator 310 can include connections for a supply line and a return line of a cooling load. A secondary liquid, which is preferably water, but can be any other suitable secondary liquid, e.g. ethylene, calcium chloride brine or sodium chloride brine, travels into the evaporator 310 via return line and exits the evaporator 310 via supply line. The liquid refrigerant in the evaporator 310 enters into a heat exchange relationship with the secondary liquid to chill the temperature of the secondary liquid. The refrigerant liquid in the evaporator 310 undergoes a phase change to a refrigerant vapor as a result of the heat exchange relationship with the secondary liquid. The vapor refrigerant in the evaporator 310 then returns to the compressors 302 and 303 to complete the cycle. It is to be understood that any suitable configuration of condenser 308 and evaporator 310 can be used in the system 300, provided that the appropriate phase change of the refrigerant in the condenser 304 and evaporator 306 is obtained.

Preferably, the control panel, microprocessor or controller 110 can provide control signals to the VSD 104 to control the operation of the VSD 104, and particularly the operation of inverters 206, to provide the optimal operational setting for the VSD 104. The control panel 110 can enable or disable inverters 206 of the VSD 104, as discussed in detail below, in response to several predetermined criteria related to initial system load conditions in order to start the maximum number of compressors to satisfy the initial system load conditions.

The control panel 110 executes a control algorithm(s) or software to control operation of the system 100 and to determine and implement an operating configuration for the inverters 206 of the VSD 104 to start the maximum number of compressor to satisfy an initial system load condition. In one embodiment, the control algorithm(s) can be computer programs or software stored in the non-volatile memory of the control panel 110 and can include a series of instructions executable by the microprocessor of the control panel 110. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the control panel 110 can be changed to incorporate the necessary components and to remove any components that may no longer be required.

Figure 4:
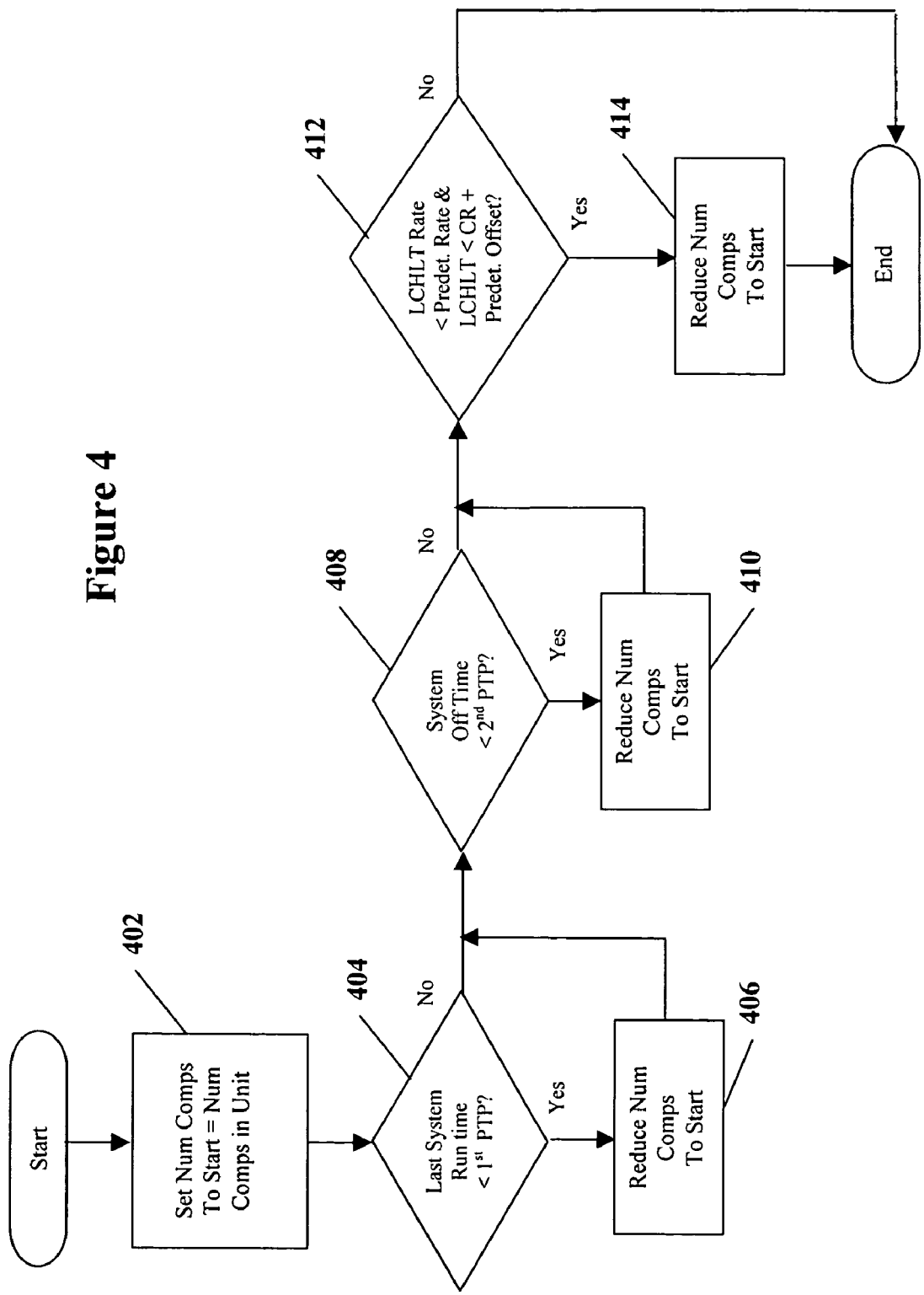
FIG. 4 is a flowchart showing an embodiment of the startup control process of the present invention.

FIG. 4 illustrates an embodiment of the startup control process of the present invention. The startup control process can be initiated in response to a starting command or instruction from a capacity control process or other control program for the chiller system. The startup control process can be a stand-alone process or program or it can be incorporated into a larger control process or program, such as a capacity control program for the chiller system.

The process begins by designating or assigning of all of the inverters in the VSD to be enabled or, similarly, designating or assigning all the compressors in the chiller system to be started in step 402. It is preferred to start and operate the maximum number of compressors in the chiller system in order to improve system efficiency and to avoid having to repeat the start process several times for multiple compressors. Next, in step 404, a determination is made as to whether a first predetermined criteria is satisfied. The first predetermined criteria is whether the last operating time period for the chiller system, i.e., the amount of time the chiller system was in operation in its last operating cycle, is less than a first predetermined time period ($1^{st}$ PTP). The first predetermined time period can be between about 1 minute and about 30 minutes and is preferably about 5 minutes. If the last operating time period for the chiller system is less than the first predetermined time period, then the number of compressors to be started is reduced by a predetermined number of compressors, preferably one compressor, in step 406. The number of compressors to be started is reduced in response to the last operating time period for the chiller system being less than the first predetermined time period because a short last operating time period for the chiller system is indicative of a reduced system load that does not require all of the compressors to be in operation.

After reducing the number of compressors to start in step 406 or if the first predetermined criteria is not satisfied in step 404, the startup control process then determines in step 408 whether a second predetermined criteria is satisfied. The second predetermined criteria is whether the off or shutdown time period for the chiller system, i.e., the amount of time the chiller system has been shutdown since its last operating cycle, is less than a second predetermined time period ($2^{nd}$ PTP). The second predetermined time period can be between about 1 minute and about 30 minutes and is preferably about 5 minutes. If the shutdown time period for the chiller system is less than the second predetermined time period, then the number of compressors to be started is reduced by a predetermined number of compressors, preferably one compressor, in step 410. The number of compressors to be started is reduced in response to the shutdown time period for the chiller system being less than the second predetermined time period because a short shutdown time period for the chiller system is indicative of a reduced system load that does not require all of the compressors to be in operation.

After reducing the number of compressors to start in step 410 or if the second predetermined criteria is not satisfied in step 408, the startup control process then determines in step 412 whether a third predetermined criteria is satisfied. The third predetermined criteria is whether the leaving chilled liquid temperature (LCHLT) rate of change is less than a predetermined LCHLT rate of change and whether the LCHLT is less than an upper control range temperature (CR) or a setpoint temperature plus a predetermined offset temperature. The LCHLT is the temperature of the liquid chilled in the evaporator as it leaves or exits the evaporator. The predetermined LCHLT rate of change can range between about 1° F./min. and about 5° F./min. and is preferably 3° F./min. The control range temperatures are preferably the desired operating range temperatures for the LCHLT of the chiller system and can preferably range between about 38° F. and about 52° F. The setpoint temperature is preferably the desired LCHLT for the chiller system and can preferably be the midpoint temperature of the control range. The predetermined offset temperature can range between about 1° F. and about 10° F. and is preferably 5° F. If the leaving chilled liquid temperature (LCHLT) rate of change is less than the predetermined LCHLT rate of change and the LCHLT is less than the upper control range temperature plus a predetermined offset temperature, then the number of compressors to be started is reduced by a predetermined number of compressors, preferably one compressor, in step 414. The number of compressors to be started is reduced in response to the leaving chilled liquid temperature (LCHLT) rate of change being less than the predetermined LCHLT rate of change and the LCHLT being less than the upper control range temperature plus a predetermined offset temperature because the low LCHLT and the low rate of change of the LCHLT are indicative of a reduced system load that does not require all of the compressors to be in operation.

On completion of step 414, or if the third predetermined criteria is not satisfied in step 412, the startup process ends and provides the number of compressors to be started to the control program, e.g., a capacity control program for the chiller system, that initiated the startup process. The number of compressors to be started is equal to the maximum number of compressors minus any reductions in the number of compressors to be started in response to satisfying any of the predetermined criteria from steps 406, 410 or 414. If the number of compressors to be started is equal to zero (or negative) because the maximum number of compressors is less then or equal to the corresponding reductions in the number of compressors, the startup control then indicates that one compressor is to be started. Alternatively, the startup control can prevent further reductions in the number of compressors to be started once the number of compressors to be started becomes equal to one.

It is to be understood that the determinations conducted in steps 404, 408 and 412 can be completed in any desired order, and that the order shown in FIG. 4 is for illustration purposes only. Furthermore, additional predetermined criteria can be incorporated into the startup control process and would provide additional opportunities to adjust the number of compressors provided. The satisfaction of the additional predetermined criteria can result in the increasing of the number of compressors to be started or decreasing the number of compressors to be started. Similarly, fewer predetermined criteria can be used in the startup control process to limit the number of compressors that are not started, i.e., to be able to start more compressors, on an initial startup of the chiller system.

In one embodiment of the present invention, one or more of the first predetermined time period, the second predetermined time period, the predetermined rate of change, the control range temperature, including the upper control range temperature, the setpoint temperature and the predetermined offset temperature can be set or adjusted by a user to a desired value. In another embodiment of the present invention, the first predetermined time period, the second predetermined time period, the predetermined rate of change, the control range temperature, including the upper control range temperature, the setpoint temperature and the predetermined offset temperature are preset and cannot be changed or adjusted by the user.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a number of compressors to start in a multiple compressor chiller system, the method comprising the steps of:

providing a multiple compressor chiller system having a predetermined number of compressors and a variable speed drive, the variable speed drive having a predetermined number of inverters, wherein each inverter is configured to power a corresponding motor of a compressor;

designating a number of inverters to be enabled on startup of the multiple compressor chiller system, wherein the designated number of inverters to be enabled on startup being initially equal to the predetermined number of inverters, and wherein enabling of an inverter at startup of the multiple compressor chiller system starts a corresponding compressor;

determining whether at least one predetermined criteria related to conditions of the multiple compressor chiller system is satisfied; and reducing the designated number of inverters to be enabled on startup by a predetermined amount in response to a determination that a predetermined criteria has been satisfied.

2. The method of claim 1 further comprising the step of repeating, for each predetermined criteria, the steps of determining whether at least one predetermined criteria related to conditions of the multiple compressor chiller system is satisfied and reducing the designated number of inverters to be enabled on startup by a predetermined amount in response to a determination that a predetermined criteria has been satisfied.

3. The method of claim 2 wherein:
the step of determining whether at least one predetermined criteria related to conditions of the multiple compressor chiller system is satisfied includes the step of determining whether a last operating time period for the multiple compressor chiller system is less than a first predetermined time period; and
the step of reducing the designated number of inverters to be enabled on startup includes the step of reducing the designated number of inverters to be enabled on startup by a predetermined amount in response to the last operating time period for the multiple compressor chiller system being less than the first predetermined time period.

4. The method of claim 3 wherein the first predetermined time period is a time period between about one minute and about thirty minutes.

5. The method of claim 4 wherein the first predetermined time period is about five minutes.

6. The method of claim 2 wherein:
the step of determining whether at least one predetermined criteria related to conditions of the multiple compressor chiller system is satisfied further includes the step of determining whether a shutdown time period for the multiple compressor chiller system is less than a second predetermined time period; and
the step of reducing the designated number of inverters to be enabled on startup further includes the step of reducing the designated number of inverters to be enabled on startup by a predetermined amount in response to the shutdown time period for the multiple compressor chiller system being less than the second predetermined time period.

7. The method of claim 6 wherein the second predetermined time period is a time period between about one minute and about thirty minutes.

8. The method of claim 7 wherein the second predetermined time period is about five minutes.

9. The method of claim 2 wherein:
the step of determining whether at least one predetermined criteria related to conditions of the multiple compressor chiller system is satisfied further includes the steps of:
determining whether a leaving chilled liquid temperature for the multiple compressor chiller system is less than a predetermined temperature; and
determining whether a leaving chilled liquid temperature rate of change for the multiple compressor chiller system is less than a predetermined leaving chilled liquid temperature rate of change; and
the step of reducing the designated number of inverters to be enabled on startup further includes the step of reducing the designated number of inverters to be enabled on startup by a predetermined amount in response to the leaving chilled liquid temperature for the multiple compressor chiller system being less than the predetermined temperature and the leaving chilled liquid temperature rate of change for the multiple compressor chiller system being less than the predetermined leaving chilled liquid temperature rate of change.

10. The method of claim 9 wherein the predetermined leaving chilled liquid temperature rate of change is a rate of change between about 1° F./min. and about 5° F./min.

11. The method of claim 10 wherein the predetermined leaving chilled liquid temperature rate of change is about 3° F./min.

12. The method of claim 11 wherein the predetermined temperature is a control range temperature plus a predetermined offset temperature.

13. The method of claim 12 wherein:
the control range temperature is a temperature between about 38° F. and about 52° F.; and
the predetermined offset temperature is a temperature between about 1° F. and about 10° F.

14. The method of claim 2 wherein the designated number of inverters to be enabled is at least one inverter.

15. The method of claim 2 wherein the step of reducing the designated number of inverters to be enabled on startup by a predetermined amount in response to a determination that a predetermined criteria has been satisfied includes the step of reducing the designated number of inverters to be enabled on startup by one inverter in response to a determination that a predetermined criteria has been satisfied.

16. The method of claim 1 wherein:
the step of determining whether at least one predetermined criteria related to conditions of the multiple compressor chiller system is satisfied includes the steps of:
determining whether a last operating time period for the multiple compressor chiller system is less than a first predetermined time period;
determining whether a shutdown time period for the multiple compressor chiller system is less than a second predetermined time period;
determining whether a leaving chilled liquid temperature for the multiple compressor chiller system is less than a predetermined temperature; and
determining whether a leaving chilled liquid temperature rate of change for the multiple compressor chiller system is less than a predetermined leaving chilled liquid temperature rate of change; and
the step of reducing the designated number of inverters to be enabled on startup includes the steps of:
reducing the designated number of inverters to be enabled on startup by a predetermined amount in response to the last operating time period for the multiple compressor chiller system being less than the first predetermined time period;
reducing the designated number of inverters to be enabled on startup by a predetermined amount in response to the shutdown time period for the multiple compressor chiller system being less than the second predetermined time period; and
reducing the designated number of inverters to be enabled on startup by a predetermined amount in response to the leaving chilled liquid temperature for the multiple compressor chiller system being less than the predetermined temperature and the leaving chilled liquid temperature rate of change for the multiple compressor chiller system being less than the predetermined leaving chilled liquid temperature rate of change.

17. A multiple compressor chiller system comprising:
a plurality of compressors, each compressor of the plurality of compressors being driven by a corresponding motor, the plurality of compressors being incorporated into at least one refrigerant circuit, each refrigerant circuit comprising at least one compressor of the plurality of compressors, a condenser arrangement and an evaporator arrangement connected in a closed refrigerant loop;

a variable speed drive to power the corresponding motors of the plurality of compressors, the variable speed drive comprising a converter stage, a DC link stage and an inverter stage, the inverter stage having a plurality of inverters, each inverter being electrically connected in parallel to the DC link stage and each inverter powering a corresponding motor of the plurality of compressors; and a control panel comprising a microprocessor and a memory device storing at least one control program, the control panel being configured to determine a number of compressors of the plurality of compressors to start on a startup of the multiple compressor chiller system, the control panel comprising means for designating at least one compressor of the plurality of compressors as the number of compressors of the plurality of compressors to start, means for evaluating at least one predetermined criteria related to system conditions, and means for adjusting the number of compressors of the plurality of compressors to start by a predetermined amount in response to satisfying a predetermined criteria.

18. The multiple compressor chiller system of claim 17 wherein the at least one predetermined criteria related to system conditions comprise a plurality of predetermined conditions related to system conditions, the plurality of predetermined conditions comprising:

a last operating time period for the multiple compressor chiller system being less than a first predetermined time period;

a shutdown time period for the multiple compressor chiller system being less than a second predetermined time period;

a leaving chilled liquid temperature for the evaporator arrangement being less than a predetermined temperature; and a leaving chilled liquid temperature rate of change for the evaporator arrangement being less than a predetermined leaving chilled liquid temperature rate of change.

19. The method of claim 18 wherein the first predetermined time period is a time period between about one minute and about thirty minutes.

20. The method of claim 19 wherein the first predetermined time period is about five minutes.

21. The method of claim 18 wherein the second predetermined time period is a time period between about one minute and about thirty minutes.

22. The method of claim 21 wherein the second predetermined time period is about five minutes.

23. The method of claim 18 wherein the predetermined leaving chilled liquid temperature rate of change is a rate of change between about 1° F./min. and about 5° F./min.

24. The method of claim 23 wherein the predetermined leaving chilled liquid temperature rate of change is about 3° F./min.

25. The method of claim 18 wherein the predetermined temperature is a control range temperature plus a predetermined offset temperature.

26. The method of claim 25 wherein:

the control range temperature is a temperature between about 38° F. and about 52° F.; and the predetermined offset temperature is a temperature between about 1° F. and about 10° F.

* * * * *